US009589723B2

(12) United States Patent
Oganisian et al.

(10) Patent No.: US 9,589,723 B2
(45) Date of Patent: Mar. 7, 2017

(54) PROCESS OF MANUFACTURING OF SOFT MAGNETIC CERAMIC AND ITS USE

(71) Applicant: INSTYTUT NISKICH TEMEPERATUR I BADAŃ STRUKTURALYNCH, Wroclaw (PL)

(72) Inventors: Karen Oganisian, Wroclaw (PL); Wieslaw Strek, Bielany Wroclawskie (PL); Andrzej Vogt, Wroclaw (PL); Pawel Gluchowski, Kamienna Gora (PL)

(73) Assignee: INSTYTUT NISKICH TEMPERATUR I BADAN STRUKTURALNYCH, Wroclaw (PL)

( * ) Notice: Subject to any disclaimer, the term of this patent is extended or adjusted under 35 U.S.C. 154(b) by 0 days.

(21) Appl. No.: 14/764,120

(22) PCT Filed: Jan. 27, 2014

(86) PCT No.: PCT/PL2014/000006
§ 371 (c)(1),
(2) Date: Jul. 28, 2015

(87) PCT Pub. No.: WO2014/120030
PCT Pub. Date: Aug. 7, 2014

(65) Prior Publication Data
US 2016/0005535 A1 Jan. 7, 2016

(30) Foreign Application Priority Data

Jan. 29, 2013 (PL) .......................... 402606

(51) Int. Cl.
C04B 35/645 (2006.01)
C04B 35/583 (2006.01)
(Continued)

(52) U.S. Cl.
CPC .......... H01F 41/02 (2013.01); C04B 35/583 (2013.01); C04B 35/6261 (2013.01);
(Continued)

(58) Field of Classification Search
CPC ............ C04B 35/583; C04B 35/62836; C04B 35/645; C04B 2235/405; C04B 2235/3272; C04B 2235/3274
See application file for complete search history.

(56) References Cited

U.S. PATENT DOCUMENTS 4,919,734 A * 4/1990 Ochiai ...................... H01F 1/24
148/306
4,927,473 A * 5/1990 Ochiai ...................... H01F 1/24
148/306

(Continued)

FOREIGN PATENT DOCUMENTS

EP    0 177 276 A2    4/1986
JP    S55 138205 A   10/1980

Primary Examiner — Erin Snelting
(74) Attorney, Agent, or Firm — Andrew W. Chu; Craft Chu PLLC

(57) ABSTRACT

A process for the manufacture of magnetic ceramic is provided including the steps of: die compacting a powder composition into a compacted body, the composition including a mixture of soft magnetic, iron or iron-based powder, core particles of which are surrounded by an electrically insulating, inorganic coating an amount of 1 to 35% by weight of the composition; and heating and pressing the compacted body in an atmosphere to a temperature and a pressure below the decomposition temperature and pressure of the magnetic, iron or iron-based powder.

13 Claims, 1 Drawing Sheet

(51) Int. Cl.
*H01F 1/34* (2006.01)
*H01F 41/02* (2006.01)
*H01F 1/24* (2006.01)
*C04B 35/626* (2006.01)
*C04B 35/628* (2006.01)
*B22F 1/02* (2006.01)
*C22C 33/02* (2006.01)

(52) U.S. Cl.
CPC ...... *C04B 35/62836* (2013.01); *C04B 35/645* (2013.01); *H01F 1/24* (2013.01); *H01F 1/34* (2013.01); *H01F 41/0246* (2013.01); *B22F 1/02* (2013.01); *C04B 2235/405* (2013.01); *C22C 33/02* (2013.01); *C22C 2202/02* (2013.01)

(56) References Cited

U.S. PATENT DOCUMENTS

| | | | |
|---|---|---|---|
| 6,193,903 B1* | 2/2001 | Gay | B22F 1/02 148/104 |
| 7,510,766 B2* | 3/2009 | Lemieux | H01F 1/1475 427/215 |
| 8,911,663 B2* | 12/2014 | Vachon | B22F 1/02 148/513 |
| 2011/0024671 A1 | 2/2011 | Otsuki et al. | |
| 2011/0031432 A1* | 2/2011 | Strasik | B82Y 30/00 252/62.55 |
| 2016/0145156 A1* | 5/2016 | Oganisian | C04B 35/645 501/1 |

* cited by examiner

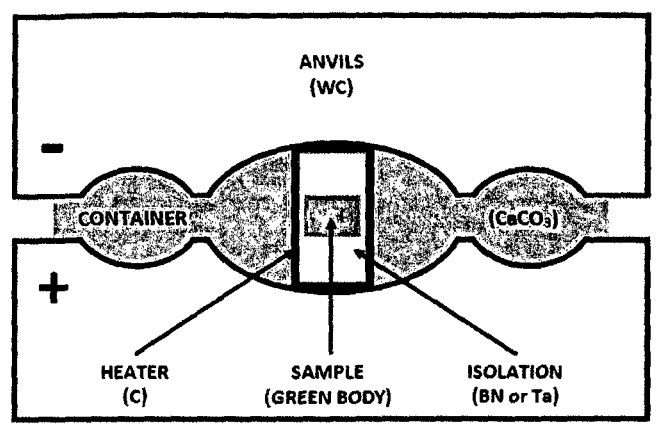

PROCESS OF MANUFACTURING OF SOFT MAGNETIC CERAMIC AND ITS USE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention concerns a new soft magnetic composite material—soft magnetic ceramic. Particularly, the invention concerns a process for the manufacturing of new soft magnetic ceramics having improved soft magnetic properties and its use.

2. Description of Related Art Including Information Disclosed Under 37 CFR 1.97 and 37 CFR 1.98.

The present soft magnetic ceramic belongs to the class of the soft magnetic composite (SMC) materials which are based on soft magnetic particles, usually iron based, with an electrically insulating coating on each particle. Following the traditionally powder metallurgy process, the SMC are obtaining by compacting the insulated, with lubricants and/or binders, particles. Obtained in this manner, SMC materials have a higher degree of freedom in comparison with that of commonly using steel laminates. During the compaction process, it is possible to obtain the SMC material of three dimensional shapes possessing a three dimensional magnetic flux. As a result, this increased interest in the SMC materials in the last decades and improvements of the soft magnetic characteristics of the SMC materials are the subject of intense studies in order to expand the application of these materials. In order to achieve such improvement, new powders and processes are continuously being developed. In addition, the values of the saturation of magnetic induction, and electric resistivity are very important parameters of SMC materials. But due to the high content of lubricants and/or binders, which are using for improving of resistivity and hardness of SMC materials, the values of magnetic induction are reducing. Best known SMC materials possess the values of saturation of magnetic induction of 1.2-1.6 T whereas the saturation of pure iron is about 2.2 T. The present process of manufacturing obtains a magnetic ceramic characterized by high value of the saturation of magnetic induction and high electric resistivity simultaneously.

SUMMARY OF THE INVENTION

The present invention concerns a process for the manufacture of magnetic ceramic comprising the steps of:

die compacting a powder composition comprising a mixture of soft magnetic, iron or iron-based powder, the core particles of which are surrounded by an electrically insulating, inorganic coating in an amount of 1 to 35% by weight of the composition and pressing into a pellet;

ejecting the compacted body from the die; pressing and heating the compacted body in a non reducing atmosphere to the pressure and temperature below (but nearby) the decomposition conditions of the iron or iron-based powder, and optionally subjecting the obtained body to heat treatment at a temperature between 300° C. and 600° C. in reduced atmosphere.

According to the present invention soft magnetic ceramics having superior magnetic, electric and mechanic properties can be obtained. These ceramics may be distinguished by superior properties such as high value of the saturation of magnetic flux at least 1.6 T, a permeability at least 7, frequency independent resistivity at least 0.01 Ohm-m up to 10 MHz with saturation 2.01 T, hardness at least 1 GPa in the Vickers Hardness units.

BRIEF DESCRIPTION OF THE DRAWINGS

The FIGURE shows a schematic view of the hydraulic press which was used for preparation of soft magnetic ceramic. "Green body" means compacted body.

DETAILED DESCRIPTION OF THE DRAWINGS

According to the present invention the soft magnetic powders are composed of iron. Preferably, the soft magnetic powder comprises nanosized carbonyl iron or essentially pure iron. A preferred electrically insulating layer that can be used according to the invention is the fine powder of the hexagonal boron nitride (BN).

The type of lubricant/binder used in iron or iron based powder is important, and BN and $TiO_2$ are selected due to their ability to thoroughly coat the iron or iron based powder particles by thin layers that significantly improve the corrosion resistance and electric resistivity of obtained materials. Using BN as lubricant allows exclusion of any binder at all from leading to an increase of iron or iron based powder content.

The compaction may be performed between 2 and 8 GPa and temperature 1000-2000° C. Best compositions may be obtained at the conditions corresponding to that of nearby (slightly below) decomposition of iron or iron based powder. If compaction is performed at pressures below 2 GPa and/or at temperatures below 1200° C. then obtained ceramic may has reduced strength. If compaction is performed at conditions corresponding to that above decomposition, then the insulating layer may be destroyed.

This procedure reduces strains in the involved iron or iron based particles that lead to increasing of permeability. If an annealing performing at temperatures below 300° C. then time of treatment may be unacceptably long. If, on the other hand, annealing performing at temperatures above 600° C. then insulating layer may be destroyed. The treatment will preferably be performed in an inert atmosphere, such as nitrogen, argon or helium.

There is an ability to add another lubricant such as titanium dioxide, graphite, graphene, silicon carbide, rare earth metals and d-block. Adding of mentioned materials controls the hardness, electric resistivity and magnetic properties of obtained ceramics.

As can be seen from the following examples soft magnetic ceramic components having remarkable properties as regards electrical resistivity, magnetic induction, and magnetic permeability can be obtained by the method according to the invention.

EXAMPLES

Example 1

Iron obtained from iron pentacarbonyl $Fe(CO)_5$, was grinded in an agate mortar (1 h) with commercial hexagonal boron nitride (BN) in different weight ratio. The resulting powder was cold pressed at a pressure of 0.2 GPa. The cold pressed pellet "compacted body" was placed in a calcium carbonate container ($CaCO_3$) with a graphite heater, then treated during I min.

TABLE 1

| Sample | Fe:BN wt % | Pressure GPa | Temperature °C. | Saturation of Magnetic Induction T | Permeability | Resistivity Ohm-m | Density g/cm³ |
|---|---|---|---|---|---|---|---|
| 2/1750 | 95:5 | 2 | 1750 | 2.05 | 12 | $2 \times 10^{-7}$ | 7.58 |
| 8/1450 | 94:6 | 8 | 1450 | 1.93 | 9.3 | 0.2 | 7.53 |
| 8/1600 | 95:5 | 8 | 1600 | 2.01 | 7 | 0.01 | 7.58 |
| 8/450 | 94:6 | 8 | 450 | 1.8 | 7 | 100 | 7.53 |
| 8/750 | 94:6 | 8 | 750 | n/a | n/a | 10 | 7.53 |

As can be seen from table 1, the best samples are obtained at the conditions slightly below decomposition ones (2/1450, 8/1600 and 8/450). Whereas application of high temperature destroyed the insulating layer that led to reduction of resistivity up to 8 orders (2/1750).

Example 2

Iron obtained from iron pentacarbonyl $Fe(CO)_5$ was grinded in an agate mortar (1 h) with titanium dioxide ($TiO_2$) and BN in the % weight ratio 79:16:5. The resulting powder was cold pressed at a pressure of 0.2 GPa. The cold pressed pellet "compacted body" was placed in a calcium carbonate container ($CaCO_3$) with a graphite heater, then treated.

The sample was treated in a high-pressure hydraulic press at 4 GPa and 1450° C. during 1 minute.

TABLE 2

| Sample | Fe:BN wt % | Pressure GPa | Temperature °C. | Saturation of Magnetic Induction T | Permeability | Resistivity Ohm-m | Density g/cm³ |
|---|---|---|---|---|---|---|---|
| 2/1750 | 79:16:5 | 4 | 1450 | 1.6 | 4.3 | $7 \times 10^{-7}$ | 7.00 |

We claim:

1. A process for manufacture of soft magnetic ceramic components, the process comprising the steps of:
   die compacting a powder composition into a compacted body in a die, the powder composition comprising a mixture of iron obtained from iron pentacarbonyl $Fe(CO)_5$, and BN;
   ejecting the compacted body from the die;
   placing the compacted body in a calcium carbonate container ($CaCO_3$) with a graphite heater; and
   treating the compacted body in conditions comprised of 2-8 GPa and 1000-2000° C. in said calcium carbonate container so as to form a ceramic composition.

2. The process according to claim 1, wherein iron and BN have a weight % relationship of at least 1:1.

3. The process according to claim 1, wherein the mixture of iron and BN is dispersed inside BN media so as to form a ceramic polycrystalline structure.

4. The process according to claim 1, further comprising the step of:
   grinding said mixture of iron and BN for at least 1 hour.

5. The process according to claim 1, wherein the step of die compacting is at room temperature.

6. The process according to claim 1, wherein the step of die compacting is at a pressure between 0.1 and 0.2 GPa.

7. The process according to claim 1, wherein said BN is in an insulating layer so as to reduce corrosion of obtained ceramic.

8. The process according to claim 1, wherein said BN is in an insulating layer so as to increase electric resistivity of obtained ceramic.

9. The process according to claim 1, wherein the electric resistivity of obtained ceramic at least 0.01 Ohm-m.

10. The process according to claim 1, said ceramic composition being comprised of at least one of a group consisting of: titanium dioxide, graphite, graphene, silicon carbide, rare earth metals and d-block elements.

11. The process according to claim 1, wherein iron and BN have a weight % relationship to other lubricants of at least 1:1.

12. A The process according to claim 1, wherein said ceramic composition possesses resistive character of conductivity with saturation of magnetic induction of at least 1.8 T.

13. The process according to claim 1, further comprising the step of: forming at least one of a group consisting of inductors, electromagnetic absorbers and wave filter components.

* * * * *